(12) United States Patent
De Souza

(10) Patent No.: US 9,770,790 B2
(45) Date of Patent: Sep. 26, 2017

(54) METAL SHEET LASER WELDING CLAMP

(71) Applicant: FORD GLOBAL TECHNOLOGIES, LLC, Dearborn, MI (US)

(72) Inventor: Urban J. De Souza, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 271 days.

(21) Appl. No.: 14/813,343

(22) Filed: Jul. 30, 2015

(65) Prior Publication Data
US 2017/0028515 A1 Feb. 2, 2017

(51) Int. Cl.
*B23K 37/04* (2006.01)
*B23K 26/70* (2014.01)

(52) U.S. Cl.
CPC ........ *B23K 37/0435* (2013.01); *B23K 26/702* (2015.10)

(58) Field of Classification Search
CPC .. B23K 37/04; B23K 37/0435; B23K 26/702; B23K 26/70
USPC ............ 219/121.63, 121.64, 121.82, 121.84; 269/287
See application file for complete search history.

(56) References Cited

U.S. PATENT DOCUMENTS

| | | | |
|---|---|---|---|
| 4,744,627 A * | 5/1988 | Chande | B23K 26/067 385/137 |
| 4,847,467 A | 7/1989 | Ausilio | |
| 4,959,522 A * | 9/1990 | Rossi | B23K 26/06 219/121.63 |
| 5,049,720 A * | 9/1991 | Fang | B23K 26/12 219/121.63 |
| 6,524,433 B2 * | 2/2003 | Sweeney, Jr. | B60J 1/005 156/108 |
| 6,569,565 B2 | 5/2003 | Ligeois et al. | |
| 7,431,685 B2 * | 10/2008 | Frey | B01J 19/0046 435/6.11 |
| 8,759,711 B2 * | 6/2014 | Wollmann | B23K 26/0732 219/121.63 |
| 2005/0109742 A1 * | 5/2005 | Nagai | B23K 26/02 219/121.73 |
| 2008/0041976 A1 * | 2/2008 | Bohlmann | F02M 51/005 239/533.2 |

FOREIGN PATENT DOCUMENTS

| | | | | |
|---|---|---|---|---|
| JP | 60007739 A * | 1/1985 | | H01L 23/26 |
| WO | 2006119274 A2 | 11/2006 | | |

OTHER PUBLICATIONS

Welding of Plastics Using Laser Radiation, http://www.leisterlaser.com/laserweldingprocess.asp., 1 page, date accessed Jul. 30, 2015.

* cited by examiner

*Primary Examiner* — Samuel M Heinrich
(74) *Attorney, Agent, or Firm* — Damian Porcari; Brooks Kushman P.C.

(57) ABSTRACT

A metal sheet laser welding clamp comprising a laser wavelength transparent body having a laser welding portion, the laser welding portion including an upper solid portion for transmitting laser wavelengths to a lower cavity portion for interfacing with a top metal sheet within a stack of metal sheets during a laser welding operation.

20 Claims, 5 Drawing Sheets

METAL SHEET LASER WELDING CLAMP

TECHNICAL FIELD

The disclosure relates to a metal sheet laser welding clamp and a method for using the same to join metal sheets.

BACKGROUND

Laser welding is a technique used to join multiple metal sheets through the use of a laser beam. The beam provides a concentrated heat source, allowing for narrow, deep welds and high heating and cooling rates. In many applications, for a proper weld to be formed, the metal sheets have to be aligned and in continuous contact along the entire length of the laser weld. To achieve the alignment, various welding clamps have been designed.

SUMMARY

A metal sheet laser welding clamp comprising a laser wavelength transparent body having a laser welding portion, the laser welding portion, including an upper solid portion for transmitting laser wavelengths to a lower cavity portion for interfacing with a metal sheet during a laser welding operation, is disclosed. The lower cavity portion may have an axial direction along its length. The lower cavity portion may have a profile along its length. The lower cavity portion profile may be constant along the length of the lower cavity portion profile. The lower cavity portion profile may be a substantially circular semi-profile. The lower cavity portion profile may be a trapezoidal profile. The lower cavity portion may have a surface including protrusions which may be about 0.1 μm to about 0.015 mm long. The metal sheet laser welding clamp may include an anti-reflective material contacting the surface of the upper solid portion of the laser welding portion. The laser welding portion may include a low-absorptive material.

In another embodiment, a metal sheet laser welding clamp is disclosed. The laser welding clamp may include a laser wavelength transparent body having a laser welding portion and a plurality of perimeter walls. The laser welding portion may include an upper solid portion for transmitting laser wavelengths to a lower cavity portion for interfacing with a metal sheet during a laser welding operation. The laser welding portion may further include one or more channels extending from the lower cavity portion to one or more of the plurality of perimeter walls. The lower cavity portion and the one or more channels each may have a profile along its length. The profiles of the lower cavity portion and the one or more channels may be constant. The cavity portion and the one or more channels each may have an axial direction along its length. The axial directions of the lower cavity portion and the one or more channels may be aligned. The one or more channels may include one or more interconnected channels.

A method of laser welding a plurality of metal sheets is disclosed. The method may include the steps of compressing the plurality of metal sheets with a clamp having a transparent body and a cavity and transmitting laser light through the body and the cavity onto the plurality of metal sheets to form a weld at a welding site of the plurality of metal sheets. The transparent body is a laser wavelength transparent body. The transmitting step may form liquid metal splatter from the plurality of metal sheets. The transmitting step may further include containing the liquid metal splatter within the cavity. The transmitting step may generate gas within the cavity and further include outgassing the gas from the cavity. The outgassing step may include outgassing the gas from the cavity through one or more channels.

DETAILED DESCRIPTION

Figure 1:
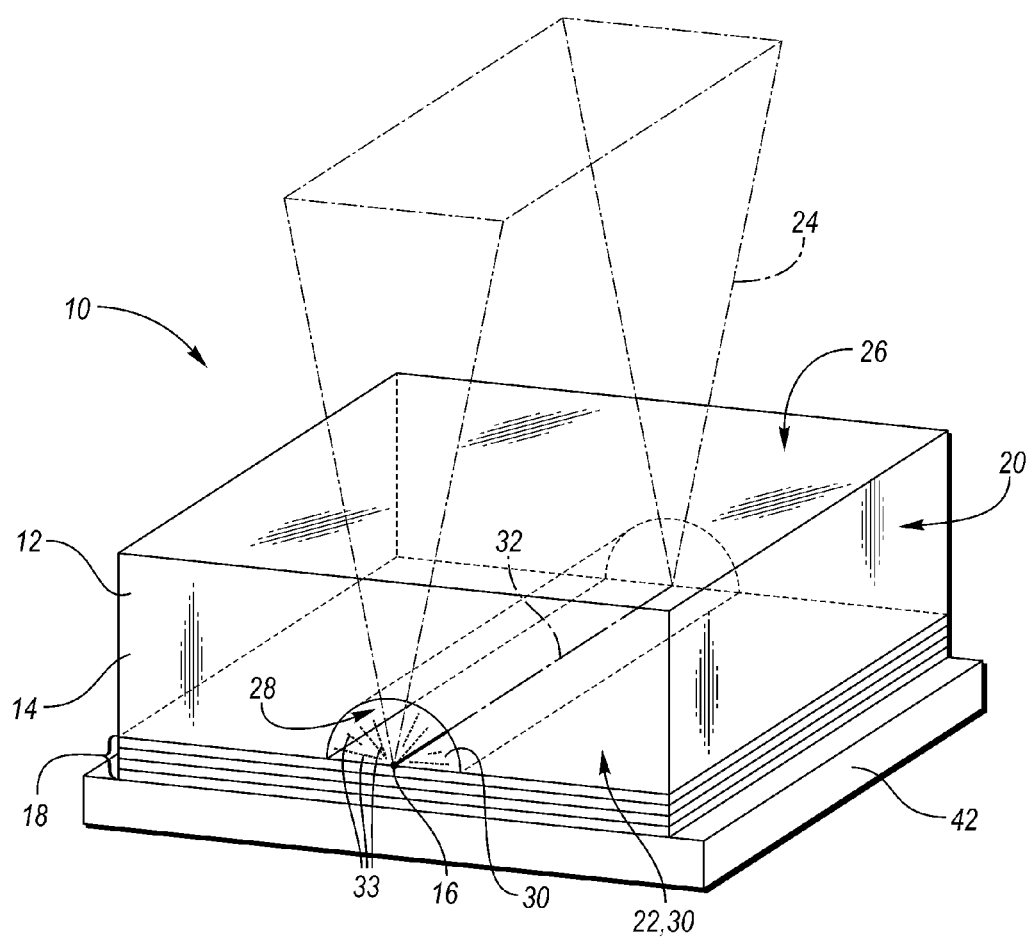
FIG. 1 depicts a perspective schematic view of a laser welding clamp and a number of metal sheets to be welded in accordance with one embodiment.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Laser welding is a high energy process used to join multiple sheets of metal using a laser beam. The laser beam is targeted on a weld joint surface. At the surface of the weld joint, the concentration of light energy is converted to thermal energy. Surface melting then occurs and progresses through the weld joint by thermal conductance. To obtain adequate mechanical weld properties in certain applications, the metal sheets should be in continuous contact and precisely aligned along the entire length of the laser weld, thereby avoiding gaps between the metal sheets which may result in a weld with insufficient strength. A variety of laser clamps have been developed to maintain metal sheets in contact with each other. An exemplary laser welding clamp is a clamp in the U.S. Pat. No. 4,847,467, disclosure of which is hereby incorporated by reference.

Previously devised clamps suffer from a number of drawbacks. For example, these clamps do not address formation of weld splatter (spatter) at the weld site. The splatter refers to molten metal droplets that are ejected from the weld site. There has been a significant interest in splatter reduction during laser welding, especially during pulsed laser welding, as the splatter droplets may result in weld defects. The weld defects may include underfill, undercuts, porosity, craters, blowholes, or blowouts, all of which may have a detrimental effect on the mechanical properties of the weld. Typical proposed solutions to weld splatter have involved reduction of power, reduction of weld temperature, increasing nozzle stand-off, defocusing laser beam, changing the pulse shape, or adjusting gas pressure to reduce power density to the weld. However, these solutions have proven inadequate because they may limit the attainable welding speed or weld penetration, and/or result in only a partial prevention of splatter formation.

Previously devised laser welding clamps also do not adequately address outgassing during welding. Gas may be formed when the laser vaporizes metal material and/or various impurities at the weld site. Certain substances such as aluminum alloys outgas and may cause undesirable formation of bubbles, pores, and cracks at the weld site during the welding process. Such formation is undesirable as potentially compromising the quality of the weld.

It is desirable to develop a laser welding clamp which would address formation of splatter at the weld site and/or provide for outgassing of the weld site. It would be also desirable to provide a clamp which would allow for increased flexibility of laser beam focusing, which would not limit attainable welding speed or require reduction of power density.

According to one or more embodiments, a transparent laser welding clamp is provided which includes a laser wavelength transparent body having a laser welding portion. The laser welding portion includes an upper solid portion and a lower cavity portion. The upper solid portion transmits laser wavelengths to the lower cavity portion. The lower cavity portion interfaces with a metal sheet during laser welding process, contains splatter within the cavity portion, and/or provides outgassing. Embodiments disclosed herein also provide a process for laser welding with the clamp of the present disclosure.

FIG. 1 depicts a non-limiting example of a laser weld clamp 10 having a laser wavelength transparent body 12 having a laser welding portion 14. The laser wavelength transparent body 12 is made from such a material that is capable of transmitting operational laser wavelength(s) through the laser welding portion 14 to the weld site 16. The laser wavelength transparent body 12 of the clamp 10 may be transparent to operational wavelengths of different lasers.

The operational wavelength of each laser depends on a laser gain medium. The gain medium is a material excited by a pump source that provides energy to the laser system. The excited gain medium produces spontaneous and stimulated emission of photons, leading to optical gain or amplification. Chemical composition of the gain medium determines the operational wavelength of the laser. The gain media may include liquid such as dye lasers in which the chemical make-up of the dye determines the operational wavelength. The liquids may be organic chemical solvent such as methanol, ethanol, ethylene glycol containing a dye such as coumarin, rhodamine, fluorescein. The gain media may include gas such as $CO_2$, Ar, Kr, and/or gas mixtures such as He—Ne. The gain medium may be metal vapor such as Cu, HeCd, HeHg, HeSe, HeAg, or Au. The gain media may include solids such as crystals and glass, usually doped with an impurity such as Cr, Nd, Er, or Ti ions. The solid crystals may include YAG (yttrium aluminum garnet), YLF (yttrium lithium fluoride), LiSAF (lithium strontium aluminum fluoride), or sapphire (aluminum oxide). Non-limiting examples of solid-state gain media doped with an impurity include Nd:YAG, Cr:sapphire, Cr:LiSAF, Er:YLF, Nd:glass, or Er:glass. The gain medium may include semiconductors having a uniform dopant distribution or a material with differing dopant levels in which the movement of electrons causes laser action. Non-limiting examples of semiconductor gain media may include InGaAs, GaN, InGaN, InGaAsP.

As the operational wavelength depends on the composition of the gain material, the operational wavelengths of different types of lasers significantly differ. The clamp 10 is therefore made from a material which is transparent to the operational wavelengths of a laser used in a particular application. The laser wavelength transparent body 12 may be transparent to one or more laser wavelengths from about 238 nm to about 10.6 µm. The laser wavelength transparent body 12 may be capable of transmitting laser wavelengths in the far ultraviolet, near ultraviolet, visible, near red, and/or far red spectrum. Table 1 below lists operational wavelength (s) of exemplary lasers which the laser wavelength transparent body 10 may be capable of transmitting.

TABLE 1

Exemplary lasers and their operational wavelength(s)

| Gain Medium | Laser Type | Operational wavelength(s) |
| --- | --- | --- |
| Cr:sapphire (ruby) | solid state | 628 nm, 694 nm |
| Er:glass | solid state | 1540 nm |
| Ti:sapphire | solid state | 650-1100 nm |
| Nd:YAP | solid state | 1080 nm |
| Nd:YAG | solid state | 1064 nm |
| Nd:YLF | solid state | 1047 nm, 1053 nm |
| Nd:glass | solid state | 1060 nm |
| Kr | gas-ion | 416 nm, 530.9 nm, 568.2 nm, 647.1 nm, 676.4 nm, 752.5 nm, 799.3 nm |
| Ar | gas-ion | 364 nm, 457.9 nm, 476.5 nm, 488 nm, 496.5 nm, 501.7 nm, 514.5 nm, 1090 nm |
| $CO_2$ | gas | 9.4-10.6 µm |
| HeNe | gas | 543 nm, 594 nm, 612 nm, 633 nm, 1152 nm |
| $N_2$ | gas | 337 nm |
| coumarin | dye | 460-515 nm |
| stilbene | dye | 390-435 nm |
| InGaAs | semiconductor | 980 nm |
| Cu | metal vapor | 511 nm, 578 nm |

Any material which is transparent to the operational wavelength(s) of a laser used may be used to produce the laser wavelength transparent body 12. Exemplary non-limiting materials may include a variety of optical materials such as borosilicate glass or borosilicate crown glass having a low index of refraction, quartz (silicon dioxide), fused silica (synthetic amorphous silicon dioxide), infrared grade calcium fluoride, magnesium fluoride, zinc selenide, various types of ceramic, or the like. The material may be amorphous or crystalline. It is desirable that the material is substantially free of a variety of impurities, cracks, bubbles, and inclusions which could interfere with transmittance of the laser wavelengths through the clamp 10.

The material may have high refractive index homogeneity of about 1.46 to about 1.8 or higher. The refractive index refers to the rate of how much the light slows down when it passes through an optical material. The material may be relatively hard as hardness may have an effect during manufacturing of the material into a certain shape which not only affects the production cost, but also durability of the optical material. The hardness of the material may be about 6-7 or more on Mohs scale of hardness, about 800 to 820 kgf/mm$^2$ measured according to Knoop's hardness test, or about 950 to 1000 kgf/mm$^2$ or more measured according to Vickers's hardness test. The material should have sufficient hardness so that the clamp 10 is repeatedly capable of applying sufficient pressure on metal sheets 18 to be properly welded. The relative hardness also affects scratch resistance of the material. The material may show good scratch resistance, good resistance to mechanical and thermal shock, and/or have overall high damage threshold. The material may have good resistance to cumulative exposure to radiation, especially to ultraviolet radiation. The material may be thermally stable and have a relatively low thermal expansion coefficient of about 0.54 to about 3.2 $10^{-6}K^{-1}$ or lower measured at 20° C. The material may have thermal conductivity of about 1 to about 1.46 W/mK measured at 20° C. In one or more embodiments, the material may have good chemical resistance to a variety of chemical substances such as fluorine. The material may have a relatively low density as not to render the resulting clamp 10 too heavy. Exemplary density of the material may be from about 1 g/cm$^3$ or lower to about 3 g/cm$^3$ or higher.

The material should have excellent transmittance in the operational wavelength(s) of the laser used such as about at least 70% or more, 80% or more, 90% or more, or 95% or more. The material may have low coefficient of absorption which renders the material suitable for uses with high power lasers. Exemplary coefficient of absorption of the material may be about 0.01 cm$^{-1}$ to about 0.05 cm$^{-1}$ measured at 190 nm or about 0.03 cm$^{-1}$ to about 0.07 cm$^{-1}$ measured at 2800 nm. The material may have a narrower or wider wavelength range such as from far ultraviolet to far infrared spectrum or any desirable range in between.

The laser wavelength transparent body 12 and the laser welding portion 14 may have a variety of shapes, sizes, and configurations, depending on a particular application. A cross-section of the laser wavelength transparent body 12 and the laser welding portion 14 may be, but is not limited to, a square, a rectangle, a triangle, or the like. The cross-section of the laser wavelength transparent body 12 and the laser welding portion 14 may be angular, regular, irregular, or the like. The laser wavelength transparent body 12 and the laser welding portion 14 may have any shape as long as the clamp 10 is capable of transmitting laser wavelengths.

In at least one embodiment, the laser welding portion 14 includes an upper portion 20 and a lower portion 22. The upper portion 20 may be solid. The upper portion 20 transmits laser wavelength(s) to the lower portion 22. When the laser beam 24 contacts the clamp 10, the laser beam 24 interfaces with the top surface 26 of the upper portion 20.

The lower portion 22 includes a cavity 28 to form a lower cavity portion 30. The cavity 28 is located above the weld site 16. In at least one embodiment, it is possible to provide two or more weld sites 16 located under one cavity 28. Alternatively, the lower cavity portion 30 may include more than one cavity 28 to be located over more than one weld site 16.

As can be seen in FIGS. 1-5, the lower cavity portion 30 may have a profile 32 along its length or a portion of its length. The profile 32 defines an outline of a shape to be formed in the clamp material along the length of the lower cavity portion 30. The profile 32 may have any size, shape, or configuration. The profile 32 may be, but is not limited to be, semi-circular, semi-oval, semi-elliptical, square, trapezoidal, triangular, rectangular, shaped like a parallelogram, rhombus, rhomboid, trapezium, pentagon, hexagon, heptagon, octagon, nonagon, decagon, or have more than ten sides. For example, the profile 32 may have curved sides and be shaped as a curved rectangle, curved square, curved trapezoid, or the like. The profile 32 may have rounded or sharp edges. The profile of the cavity 28 may contribute to increased flexibility in accuracy with which the laser beam 24 has to be pointed at the weld site 16. For example, the semi-circular profile, as is depicted in FIG. 1, curved rectangular profile, as is depicted in FIG. 2A, or trapezoidal profile, as is depicted in FIG. 2B, allow for the laser beam 24 to be aimed at more than one point at the weld site 16 while achieving a satisfactory quality of the resulting weld 32.

In one or more embodiments, the lower cavity portion 30 may have an axial direction along its length. The lower cavity portion 30 comprising the cavity 28 may extend to one or more perimeter walls 34. The cavity 28 may extend through the entire length of the clamp 10. Alternatively, the cavity 28 may extend through a portion of the clamp 10. The cavity 28 which extends through a portion of the clamp 10 does not reach one or more perimeter walls. Such cavity 28 may have any profile, as recited above. For example, the cavity 28 may be located only in a central portion of the lower cavity portion 30 and have a semi-circular profile to form a dome capable of containing splatter within the cavity, as is illustrates in FIGS. 6A and 6B.

Figure 2A:
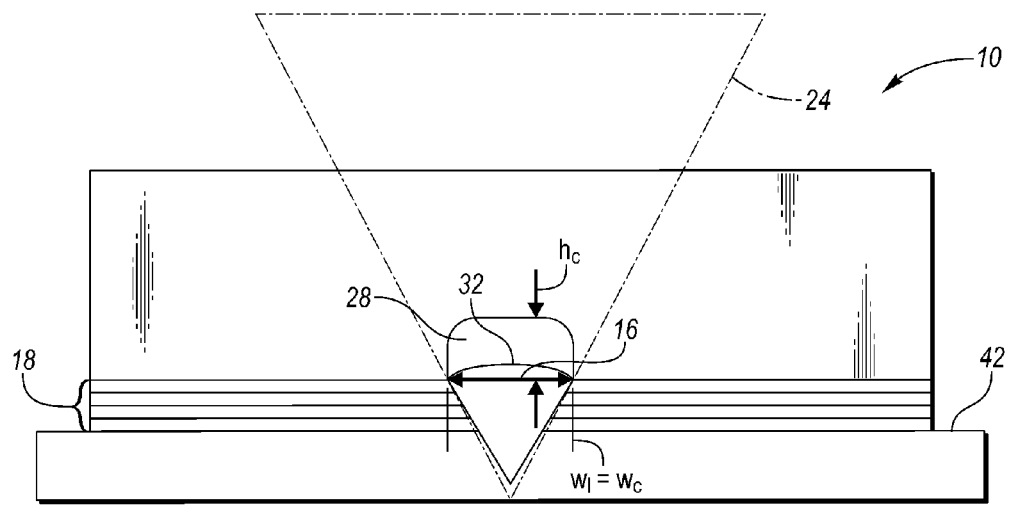
FIG. 2A depicts a side view of the laser welding clamp of FIG. 1 depicting an alternative profile.
Figure 2B:
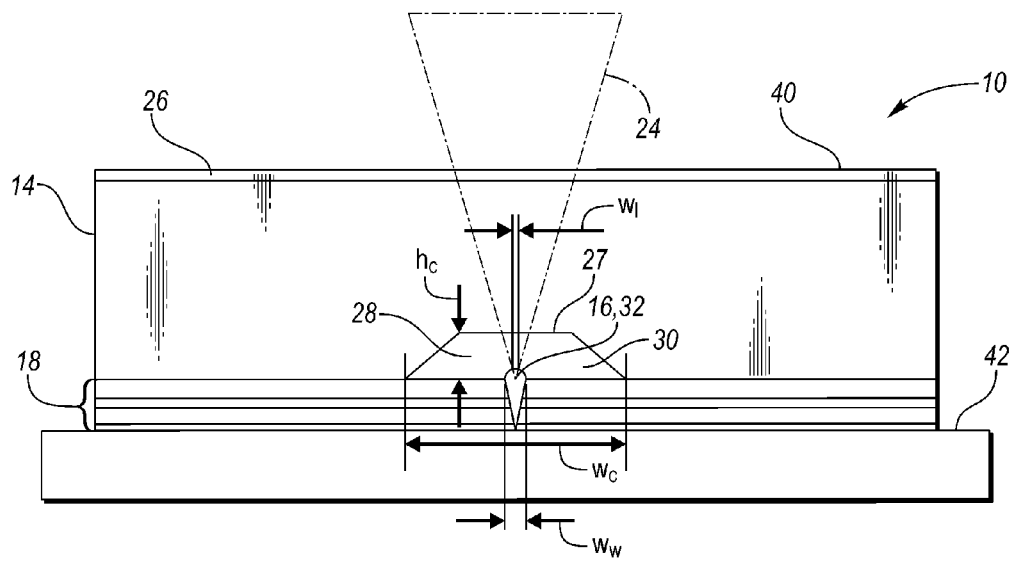
FIG. 2B depicts a side view of the laser welding clamp of FIG. 1 depicting an alternative profile and alternative thickness of the sheets.
Figure 6A:
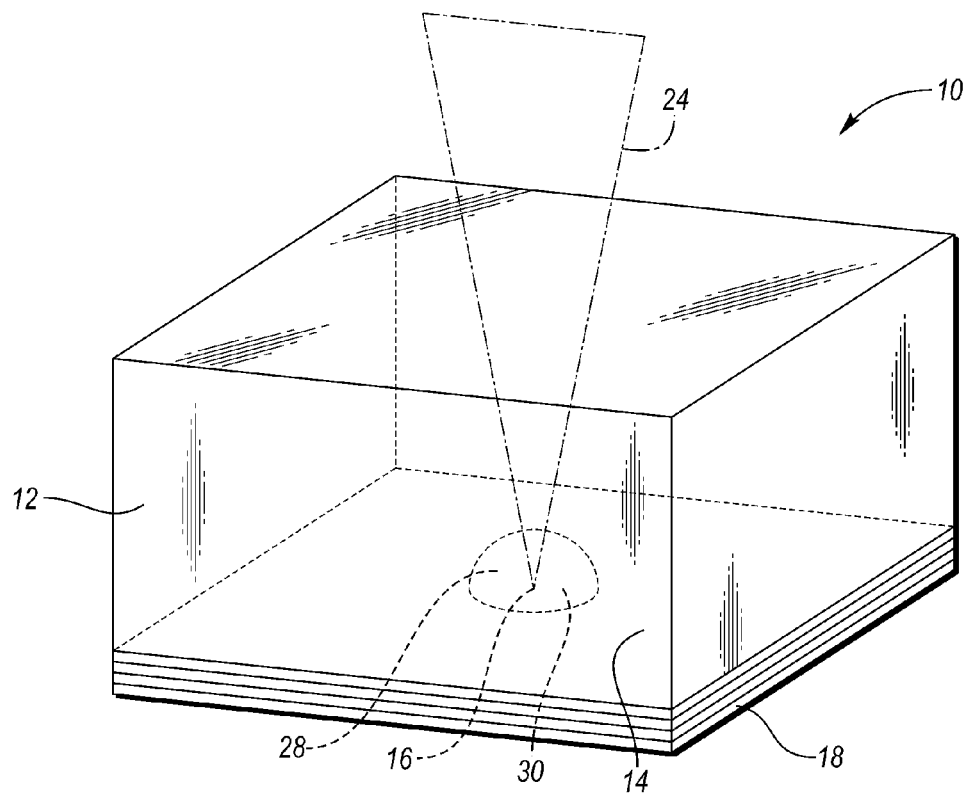
FIG. 6A illustrates a perspective schematic view of a clamp having a cavity extending partially through the length of the lower cavity portion according to one or more embodiments.
Figure 6B:
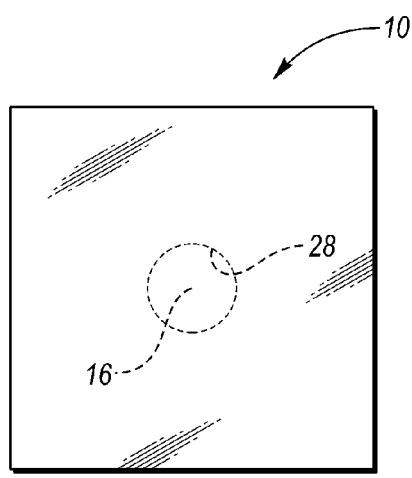
FIG. 6B depicts a bottom view of the clamp of FIG. 6A.
Figure 6C:
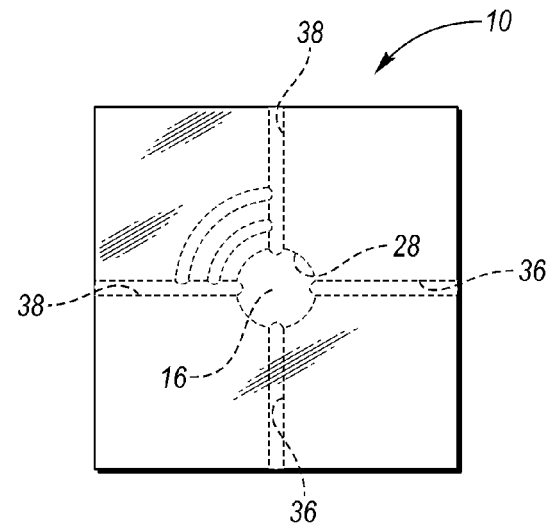
FIG. 6C depicts a bottom view of an alternative embodiment of the clamp of FIG. 6B including a number of channels.

The laser beam 24 may be a spot laser beam, as is depicted in FIGS. 6A-6C producing a spot weld. Alternatively, the laser beam 24 may travel along a length of the metal sheet stack 18, as is depicted in FIG. 1. The cavity 28 has dimensions to accommodate a width $w_1$ of the laser beam 24 at the weld site 16. As FIG. 2A illustrates, the cavity 28 may be as wide as the width $w_1$ of the laser beam 24 interfacing with the weld site 16. Alternatively, as can be seen in FIG. 2B, the cavity may be wider than the width $w_1$ of the laser beam 24 interfacing with the weld site 16. The $w_1$ of the laser beam 24 interfacing with the weld site 16 may be calculated as the focus spot size of the laser beam 24. The $w_1$ of the laser beam 24 may be from about several thousands of an inch to several hundreds of an inch in diameter, from about 0.1 mm to about 0.8 mm or about 0.2 mm to about 0.4 mm.

In at least one embodiment, the cavity 28 has a width $w_c$ which exceeds the width $w_w$ of the weld at the weld site 16. The width $w_c$ of the cavity 28 may exceed the width $w_w$ of the weld 32 at the weld site 16 by about 1% to about 500% or more, by about 50% to about 250%, by about 100% to about 175%. The width $w_c$ of the cavity may be about 1.5 times, 2 times, 5 times, or 10 times or more larger than the width $w_w$ of the weld 32 at the weld site 16. The $w_w$ of the weld 32 may be about 0.2-2 mm. The $w_c$ of the cavity 28 may be about 0.3 mm to 20 mm. Alternatively, the width of the weld $w_w$ may exceed the width of the cavity $w_c$ at the weld site 16 by about less than 1% to by about 50% or more.

The cavity has such a width $w_c$ and height $h_c$ that it can prevent droplets of splatter 33 from forming underfill, undercuts, porosity, cracks, craters, blowholes, or blowouts at the weld site 16 and/or to provide sufficient space so that the gas from the weld site 16 may be effectively released away from the weld 32. The cavity 28 may fulfill the dual function of splatter prevention and outgassing or just one of these functions. The shape and dimensions of the cavity 28 will determine this. For example, the dome-shaped cavity 28 formed in the central portion of the lower cavity portion 30, as depicted in FIGS. 6A and 6B, may prevent splatter formation while a cavity 28 extending the entire length of the clamp 10, as depicted in FIGS. 1-5, may prevent splatter as well as provide at least one outgassing pathway.

To further facilitate outgassing, the lower cavity portion 30 of the clamp 10 may include one or more channels 36 extending from the lower cavity portion 30 to one or more of the plurality of perimeter walls 34. The one or more channels 36 provide escape pathways to gases formed at the weld site 16. The one or more channels 36 may provide the only escape pathways to gases formed at the weld site 16, such as in FIG. 6C, or additional outgassing pathways, such as in FIGS. 1-5, as the gasses may escape through the cavity 28 as well.

Figure 4:
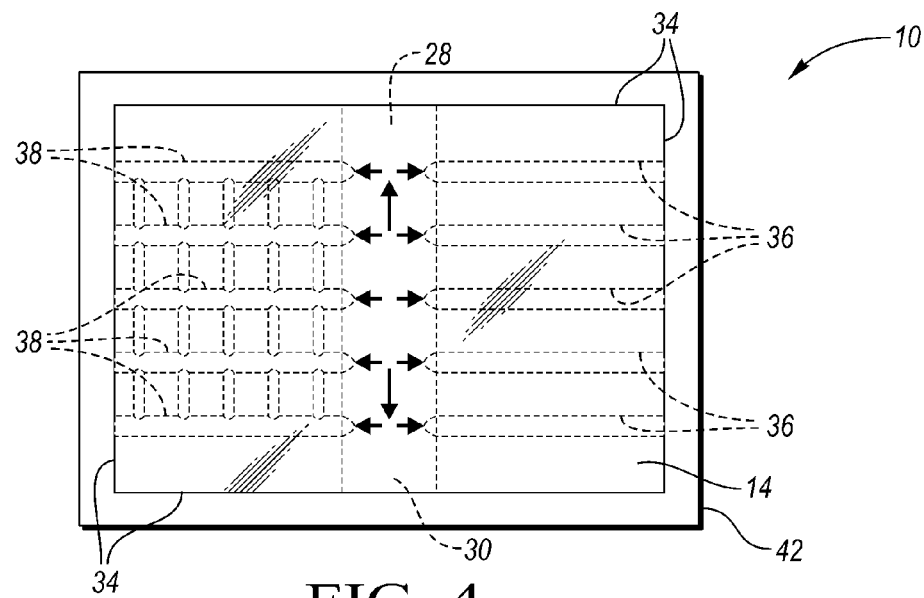
FIG. 4 shows a bottom view of the clamp of FIG. 3.

The one or more channels 36 may have a profile along their length. The profile of the one more channels 36 may have one of the shapes of a cavity profile as described above. The profile of one or more channels 36 may be substantially the same or different than the profile of the cavity 28. The profiles of the lower cavity portion 30 and the one or more channels 36 may be, but do not have to be, constant. In at least one embodiment, at least some of the channels 36 have a different profile than the remaining channels 36. Both the lower cavity portion 30 and the one or more channels 36 each may have an axial direction along its length. The axial direction of the lower cavity portion 30 and the one or more channels 36 may be, but do not have to be, aligned. In one or more embodiments, the one or more channels 36 may include one or more interconnected channels 38. The interconnected channels 38 may be connected with a variety of additional channels having the same or different dimensions as the interconnected channels 38. The interconnected channels 38 may form a lattice. In at least one embodiment, as depicted in FIG. 4, a portion of the lower cavity portion 30 may include interconnected channels 38 while another portion may include one or more channels 36. Alternatively, the entire lower cavity portion 30 may include interconnected channels 38. Alternatively still, the entire lower cavity portion 30 may include one more channels 36.

In order to provide excellent transmittance of the operational wavelength(s), it may be desirable that at least some of the surfaces of the clamp have a smooth surface that is even, free of ridges, inequalities, projections, breaks, or bumps. The surface may be rough and include protrusions which may be about 0.1 μm to about 0.015 mm long. The surface roughness within this range is especially useful at the interface of the laser with the top surface of the upper portion 26 of the clamp 10, the inner surface of the cavity 27, or both. The roughness within this range provides a surface substantially free of protrusions and impurities which may divert, defocus, or absorb the laser beam. Surface quality, and thus roughness, of the clamp may be assessed using a scratch-dig performance specification in accordance with MIL-PRF-13830B; which is hereby incorporated as a reference in its entirety. The scratch designation is determined by comparing scratches on the surface being assessed to a set of standard scratches under controlled lighting conditions. The dig designation relates to a small pit in the surface and is calculated as the diameter of the pit in microns divided by 10. The clamp surfaces should thus have scratch-dig specifications of about 80-50 which is considered standard quality, about 60-40 which is considered precision quality, or about 20-10 which is considered high precision quality.

Because all metals reflect light to some degree, especially metals such as gold, silver, copper, and aluminum, the metal sheets 18 may be difficult to weld, requiring intense energy usually available from high energy peaking pulses. A choice of a laser with a shorter operational wavelength such as the 1.06 μm operational wavelength of the Nd:YAG laser which is more readily absorbed than longer operational wavelengths such as 10.6 μm of the $CO_2$ laser renders certain lasers more suitable for welding of highly reflective metal sheets 18. In addition, light absorbing material such as graphite may be applied to the joint surface of the weld 32 to lower reflectivity of the metal sheets 18. The light absorbing material may be applied as a coating. The light absorbing coating is selected according to an operational wavelength of a laser used. Exemplary absorbing materials may have peak wavelengths anywhere within the ultraviolet, visible, and infrared spectra.

Figure 3:
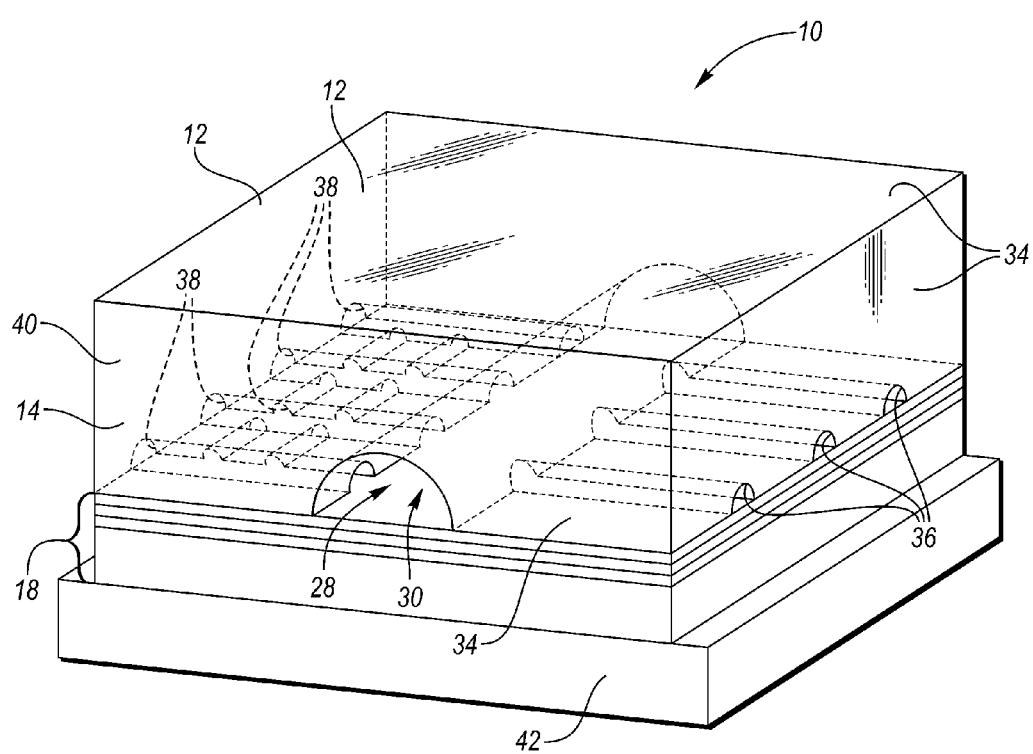
FIG. 3 depicts a perspective schematic view of a clamp having a cavity and a number of channels in accordance with one embodiment.

Alternatively, in one or more embodiments, it may be desirable to provide a low-absorptive, low-refractive, and/or anti-reflective layer or layers 40 on at least one surface of the clamp 10 or make at least some portions of the clamp 10 such as the upper portion 20, the lower portion 22, the laser welding portion 14, or a combination thereof from a material having low-absorptive, low-refractive, and/or anti-reflective properties to achieve excellent transmission such as above about 90%. FIG. 2B illustrates an anti-reflective material layer 40 contacting the surface of the upper solid portion 20 of the laser welding portion 14. FIG. 3, on the other hand, illustrates the laser wavelength transparent body 12 including a low-absorptive material 40. The low-absorptive material may be about 0-50% absorptive. The type of material the laser welding portion 14 is made from will determine the need for low-absorptive, low-refractive, and/or anti-reflective layers. Materials with low index of refraction such as magnesium fluoride may not require an anti-reflective layer. On the other hand, materials such as zinc selenide which have a high index of refraction may require an anti-reflective layer to achieve high transmission. Exemplary anti-reflective coating layers may include materials having reflectance $R_{ave}$ of less than 0.25 to 1.5% at the operational wavelengths of the laser welding portion 14.

As was stated above, the clamp 10 is sufficiently hard to provide sufficient clamping pressure to the metal sheets 18. Sufficient pressure is developed if the metal sheets 18 are aligned and pressed to remain aligned to produce a substantially gap-free joint at the weld site 16. The clamping force is sufficient if the metal sheets 18 remain aligned during the welding process. Lack of intimate contact of the metal sheets 18 during the welding operation may reduce total area of conductive weld which is detrimental, especially in some applications. Such applications include, but are not limited to, applications that demand about 500 Amp in about 10 sec charging without producing a transient thermal event locally such as DC fast-charge in high voltage batteries. The stack of metal sheets 18 is substantially gap free if no gaps larger than about 50 μm appear between stacked laser welded sheets. Gaps larger than about 50 μm may result in reduced mechanical properties of the weld 32 and compromised weld quality along the length of the weld 32 for the intended purpose.

The metal sheets 18 may be located between the clamp 10 and a base plate 42. The base plate 42 may be made from a variety of materials such as materials disclosed for the metal sheets 18 themselves referenced below. The base plate 42 may be made from a material requiring higher temperature to melt than the metal sheets 18. The base plate 42 has to be sufficiently hard and temperature resistant to withstand the laser welding process without disintegrating. It is desirable that the base plate 42 is non-deforming. The base plate 42 may be attached to a fixture to prevent its displacement and thus prevent misalignment of the metal sheets 18 during the welding process.

The metal sheets 18 to be joined by the laser welding may have various dimensions. Exemplary metal sheets 18 may have thickness of less than about 0.2 mm to more than about 0.8 mm. The metal sheets 18 may be foil. The clamp 10 may be used to join one or more metal sheets 18 of the same thickness, as can be seen in FIGS. 1 and 2A, or different thickness, as is illustrated in FIGS. 2B and 3. The clamp 10 may be also utilized for microwelding of microelectronics. The metal sheets 18 may thus have dimensions in microscale.

The material of the metal sheets 18 may vary, depending on a specific application. Exemplary material of one or more of the metal sheets 18 includes, but is not limited to, aluminum, silver, gold, copper, tin, nickel, titanium, steel such as stainless steel, the like, or their alloys. While the sheets 18 are references as metal sheets 18, it is contemplated that the clamp 10 could be utilized during laser welding of sheets involving other materials such as thermoplastics.

The clamp 10 and the related method of the present disclosure may be used to join the sheets 18 in a variety of applications such as medical devices, biotechnology, electronics, automotive, aerospace, alternative energy/photovoltaics. An exemplary use of the clamp 10 may be in a high-voltage battery tab to tab and tab to busbar welding. A non-limiting exemplary use of the clamp 10 may be laser welding of electrical terminals in a high-voltage battery for battery electric vehicles. It is contemplated that the metal sheet 18 stacks including a number of sheets 18 with a thickness of less than 0.2 mm would be laser welded while utilizing the clamp 10 of the present disclosure. The resulting laser welded cell tab may replace battery ultrasonic welded stacks. While the method of the present disclosure may require relatively high upfront costs, when compared to ultrasonic welding, the present method may result in lower unit cost due to faster and highly repeatable positioning of the laser beam and lower maintenance costs than ultrasonic welding. The clamp 10 and the related method of its use may be also utilized in fuel cell applications such as in welding of metal separators for fuel cells. Such application may require welding into narrow valleys, on areas about 0.15 mm wide.

The present disclosure further provides a method of laser welding of a number of metal sheets 18 by compressing the metal sheets 18 with a clamp 10 having a laser wavelength transparent body 14 and a cavity 28. The compressing step may include placing a number of metal sheets 18 between the clamp 10 and one or more base plates 42. The process further includes a step of transmitting laser light through the laser wavelength transparent body 14 and the cavity 28 onto the metal sheets 18 to form a weld 32 at a welding site 16 of the metal sheets 18. The transmitting step forms liquid metal splatter 33 from the number of metal sheets 18. The process includes a step of containing the liquid metal splatter 33 within the cavity 28. The transmitting step further generates gas within the cavity 28. The method further provides a step of outgassing the gas from the cavity 28. The outgassing step may include outgassing the gas from the cavity 28 through one or more channels 36 or one or more interconnected channels 38.

Figure 5A:
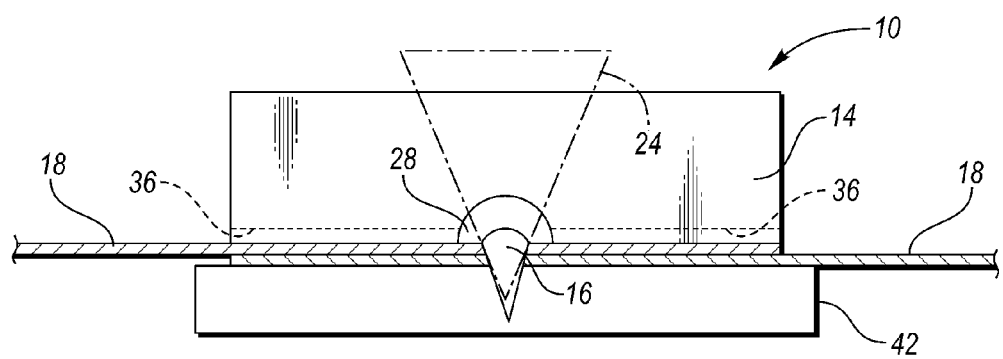
FIG. 5A shows a schematic side view of a clamp and a number of sheets overlapping on opposite sides according to one or more embodiments.
Figure 5B:
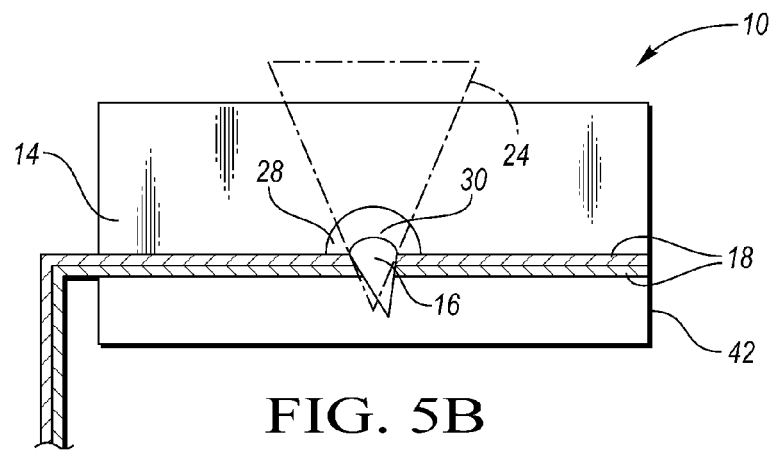
FIG. 5B shows a schematic side view of a clamp and a number of sheets overlapping on the same side according to at least one embodiment.

The method may further include forming battery tabs and/or battery busbars while utilizing the clamp 10. FIGS. 5A and 5B illustrate forming battery tabs by overlapping metal sheets 18. FIG. 5A shows overlapping of the opposite ends of two metal sheets 18 to be welded. FIG. 5B illustrates same side overlapping of two metal sheets 18 to be welded.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A metal sheet laser welding clamp comprising:
   a laser wavelength transparent body having a laser welding portion, and
   the laser welding portion including an upper solid portion for transmitting laser wavelengths to a lower cavity portion for interfacing with a metal sheet during a laser welding operation.

2. The metal sheet laser welding clamp of claim 1, wherein the lower cavity portion has an axial direction along its length.

3. The metal sheet laser welding clamp of claim 1, wherein the lower cavity portion has a profile along its length.

4. The metal sheet laser welding clamp of claim 3, wherein the lower cavity portion profile is constant along the length of the lower cavity portion profile.

5. The metal sheet laser welding clamp of claim 3, wherein the lower cavity portion profile is a substantially semi-circular profile.

6. The metal sheet laser welding clamp of claim 3, wherein the lower cavity portion profile is a trapezoidal profile.

7. The metal sheet laser welding clamp of claim 1, wherein the lower cavity portion and/or the upper solid portion has a surface including a plurality of protrusions in a range of about 0.1 μm to about 0.015 mm long.

8. The metal sheet laser welding clamp of claim 1, further comprising an anti-reflective material contacting a surface of the upper solid portion of the laser welding portion.

9. The metal sheet laser welding clamp of claim 1, wherein the laser welding portion includes a low-absorptive material.

10. A metal sheet laser welding clamp comprising:
    a laser wavelength transparent body having a laser welding portion and a plurality of perimeter walls, the laser welding portion including an upper solid portion for transmitting laser wavelengths to a lower cavity portion for interfacing with a metal sheet during a laser welding operation, and
    one or more channels extending from the lower cavity portion to one or more of the plurality of perimeter walls.

11. The metal sheet laser welding clamp of claim 10, wherein the lower cavity portion and the one or more channels each have a profile along its length.

12. The metal sheet laser welding clamp of claim 11, wherein the profiles of the lower cavity portion and the one or more channels are constant.

13. The metal sheet laser welding clamp of claim 10, wherein the lower cavity portion and the one or more channels each have an axial direction along its length.

14. The metal sheet laser welding clamp of claim 13, wherein the axial directions of the lower cavity portion and the one or more channels are aligned.

15. The metal sheet laser welding clamp of claim 10, wherein the one or more channels include one or more interconnected channels.

16. A method of laser welding a plurality of metal sheets comprising:

compressing the plurality of metal sheets with a clamp having a transparent body and a cavity; and transmitting laser light through the transparent body and the cavity onto the plurality of metal sheets to form a weld at a welding site of the plurality of metal sheets.

17. The method of claim 16, wherein the transparent body is a laser wavelength transparent body.

18. The method of claim 16, wherein the transmitting step forms liquid metal splatter from the plurality of metal sheets, and further comprising containing the liquid metal splatter within the cavity.

19. The method of claim 16, wherein the transmitting step generates gas within the cavity, and further comprising outgassing the gas from the cavity.

20. The method of claim 19, wherein the outgassing step includes outgassing the gas from the cavity through one or more channels.

\* \* \* \* \*